(12) United States Patent
Rudnisky et al.

(10) Patent No.: US 8,922,419 B2
(45) Date of Patent: Dec. 30, 2014

(54) JAM ASSIGNMENT MANAGER

(71) Applicant: Raytheon Company, Waltham, MA (US)

(72) Inventors: William Rudnisky, Los Angeles, CA (US); Robert E. Vitali, Huntington Beach, CA (US); Russell W. Lai, Rancho Palos, CA (US); Ryan D. Retting, Redondo Beach, CA (US); Jeffery Jay Logan, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 241 days.

(21) Appl. No.: 13/709,527

(22) Filed: Dec. 10, 2012

(65) Prior Publication Data

US 2014/0159934 A1    Jun. 12, 2014

(51) Int. Cl.
*G01S 7/38* (2006.01)
*H04K 3/00* (2006.01)

(52) U.S. Cl.
CPC ..... *G01S 7/38* (2013.01); *H04K 3/00* (2013.01)
USPC .............................................. 342/14; 342/195

(58) Field of Classification Search
CPC .................................... G01S 7/38; H04K 3/00
USPC ...................................................... 342/13–19
See application file for complete search history.

(56) References Cited

U.S. PATENT DOCUMENTS

| | | | |
|---|---|---|---|
| 4,025,920 A * | 5/1977 | Reitboeck et al. | 342/13 |
| 5,574,458 A | 11/1996 | Tran | |
| 6,480,139 B1 * | 11/2002 | Hoctor | 342/13 |
| 6,844,841 B1 * | 1/2005 | Masciulli | 342/13 |
| 8,229,344 B1 | 7/2012 | Petersen et al. | |
| 2007/0083868 A1 | 4/2007 | Sankaranarayan et al. | |
| 2008/0136701 A1 * | 6/2008 | Ferm et al. | 342/14 |

(Continued)

FOREIGN PATENT DOCUMENTS

| | | |
|---|---|---|
| EP | 2306314 A3 * | 6/2012 |
| WO | WO 2014092847 A1 * | 6/2014 |

OTHER PUBLICATIONS

Dehnie, S.; Ghanadan, R.; Guan, K., "Resource allocation for networked electronic warfare," Military Communications Conference, 2011—Milcom 2011, vol., No., pp. 108,112, Nov. 7-10, 2011.*

(Continued)

*Primary Examiner* — John B Sotomayor
(74) *Attorney, Agent, or Firm* — Cantor Colburn LLP (57) ABSTRACT

A method for allocating system resources includes receiving, by a processor, an assignment list that includes a first assignment and a second assignment, each assignment is assigned a priority and includes tasks associated with each assignment, assigning each assignment to a system resource according to the assigned priority of each assignment, populating a tree for the system resource, the tree including each assignment assigned to the system resource ordered by the relative priority of the assignments, generating task roots associated with each task associated with each assignment in the tree, associating each task root with a task score, defining a first system resource root that includes the task roots having the lowest task scores, calculating a first system resource root score as a function of the task scores of the first system resource root, and saving the first system resource root as the current best estimate system resource root.

20 Claims, 9 Drawing Sheets

(56) References Cited

U.S. PATENT DOCUMENTS

| | | | |
|---|---|---|---|
| 2008/0297394 A1* | 12/2008 | Dark et al. | 342/13 |
| 2009/0178046 A1 | 7/2009 | Jain et al. | |
| 2009/0224956 A1* | 9/2009 | Dark et al. | 342/13 |
| 2010/0283666 A1* | 11/2010 | Lee et al. | 342/175 |
| 2011/0080897 A1 | 4/2011 | Hernandez et al. | |
| 2014/0159934 A1* | 6/2014 | Rudnisky et al. | 342/14 |

OTHER PUBLICATIONS

Murrill, J., "Electronic countermeasures (ECM) technique measurements and automation methods," Autotestcon, 2012 IEEE, vol., No., pp. 88,92, Sep. 10-13, 2012.*

PCT International Search Report and Written Opinion; International Application No. PCT/US13/63797; International Filing Date: Oct. 8, 2013; Date of Mailing: Apr. 21, 2014; pp. 1-14.

* cited by examiner

FIG. 3A — TECHNIQUE SHARING

FIG. 3B — DUTY SHARING

JAM ASSIGNMENT MANAGER

BACKGROUND

The present invention relates to electronic warfare systems, and more specifically, to electronic jamming systems.

Electronic jamming systems, include systems that are operative to emit electromagnetic signals that are operative to interfere and disrupt radar, fire control, and communication systems. For example, an airborne electronic jamming system may be used to enter an airspace and emit a variety of jamming signals during a mission. The jamming signals may be emitted based on known locations of electronic emissions or may be emitted in a response to sensed electronic emissions.

The electronic jamming systems often include a number of system resources such as emitters or transmission systems that may emit a variety of signals. In planning a mission, assignments that include jamming tasks are evaluated and assigned to system resources.

SUMMARY

According to an embodiment of the present invention, a method for allocating system resources of an electronic warfare jamming system includes receiving, by a processor, an assignment list that includes a first assignment and a second assignment, where each assignment is assigned a priority and includes tasks associated with each assignment, assigning each assignment to a system resource according to the assigned priority of each assignment, populating a decision tree for the system resource, the decision tree including each assignment assigned to the system resource ordered by the relative priority of the assignments, generating task roots associated with each task associated with each assignment in the decision tree, associating each task root with a task score, defining a first system resource root that includes the task roots having the lowest task scores, calculating a first system resource root score as a function of the task scores of the first system resource root, and saving the first system resource root as the current best estimate system resource root.

According to another embodiment of the present invention, an electronic warfare jamming system includes a first system resource, and a processing system operative to receive, by a processor, an assignment list that includes a first assignment and a second assignment, where each assignment is assigned a priority and includes tasks associated with each assignment, assign each assignment to a system resource according to the assigned priority of each assignment, populate a decision tree for the system resource, the decision tree including each assignment assigned to the system resource ordered by the relative priority of the assignments, generate task roots associated with each task associated with each assignment in the decision tree, associate each task root with a task score, define a first system resource root that includes the task roots having the lowest task scores, calculate a first system resource root score as a function of the task scores of the first system resource root, and save the first system resource root as the current best estimate system resource root.

According to yet another embodiment of the present invention, an electronic warfare jamming system includes a first system resource, and a processing system operative to receive, by a processor, an assignment list that includes a first assignment and a second assignment, where each assignment is assigned a priority and includes tasks associated with each assignment, assign each assignment to a system resource according to the assigned priority of each assignment, populate a decision tree for the system resource, the decision tree including each assignment assigned to the system resource ordered by the relative priority of the assignments, generate task roots associated with each task associated with each assignment in the decision tree, associate each task root with a task score, define a first system resource root that includes the task roots having the lowest task scores, calculate a first system resource root score as a function of the task scores of the first system resource root, and save the first system resource root as the current best estimate system resource root.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Previous jamming systems associated jamming assignments to system resources using an allocation logic that often failed to optimally associate jamming assignments with system resources. The embodiments described below include methods and systems that more effectively allocate system resources to jamming assignments.

Figure 1:
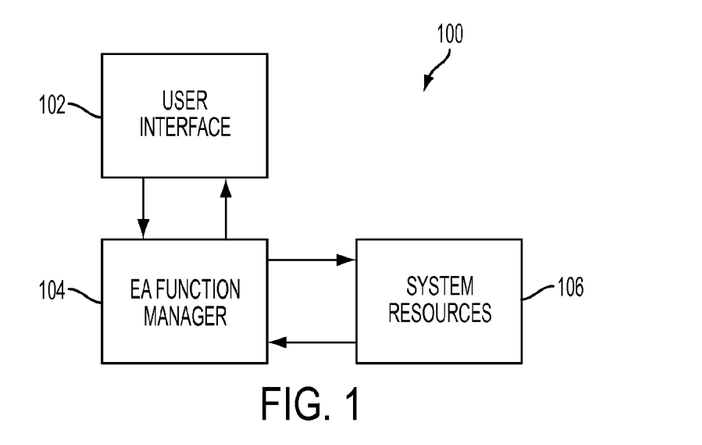
FIG. 1 illustrates a block diagram of a portion of a jamming system.

FIG. 1 illustrates a block diagram of a portion of a jamming system 100. The jamming system 100 includes an electronic attack (EA) function manager portion 104 that is communicatively connected to a user interface 102 and system resources 106. The EA function manager 104 portion includes data processing and memory resources. The user interface 102 includes, for example, input and display devices that facilitate a user's interaction with the system 100. The system resources 106 may include any number of system resources such as, for example, sensors, receivers, emitters, transmitters, and power supplies.

Figure 2:
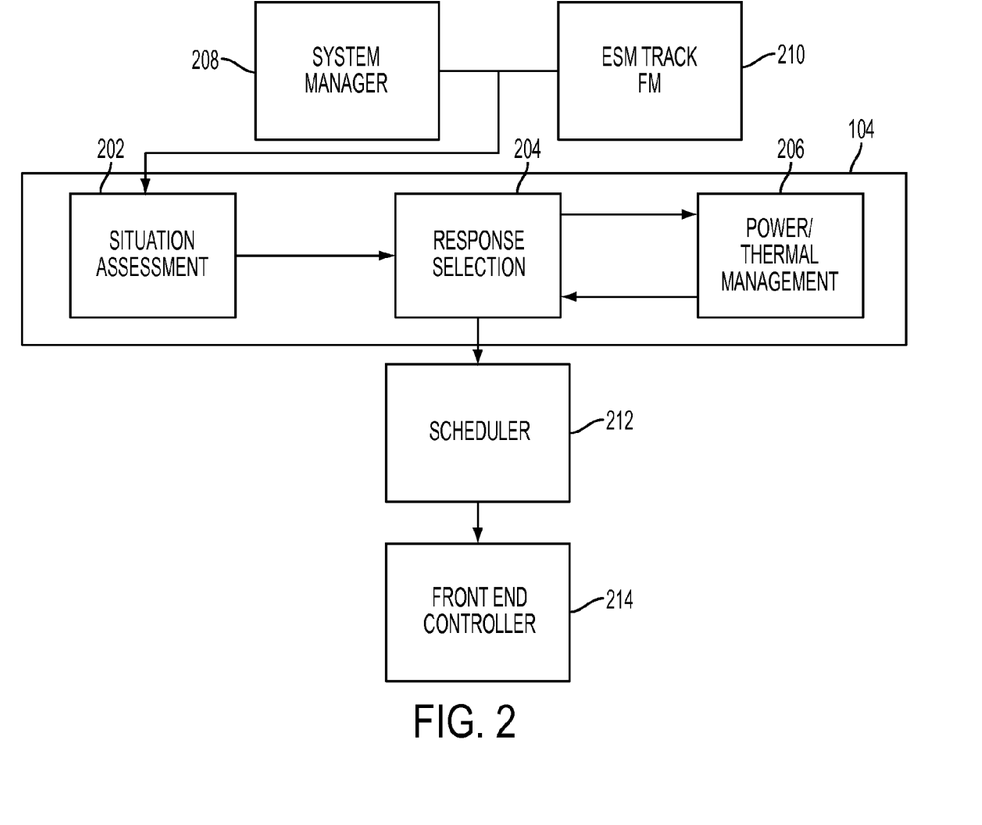
FIG. 2 illustrates a block diagram of the EA function manager of FIG. 1.

FIG. 2 illustrates a block diagram of the EA function manager 104. In this regard, the EA function manager 104 includes a variety of processing and memory systems that are operative to manage system resources. The EA function manager 104 includes a situation assessment portion 202, a response selection portion 204, and a power/thermal management portion 206. A system manager portion 208 and an electronic signals management (ESM) track function manager (FM) portion 210 are communicatively connected to the situation assessment portion 202. A scheduler portion 212 is communicatively connected to the response selection portion 204, and a front end controller 214 is communicatively connected to the scheduler portion 212.

Figure 3A:
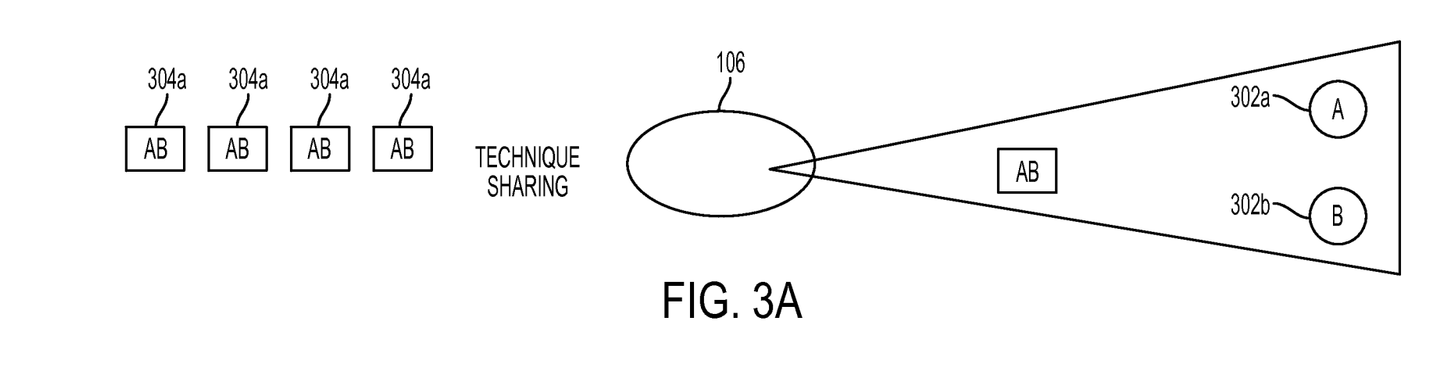
FIG. 3A illustrates a technique sharing mode.
Figure 3B:
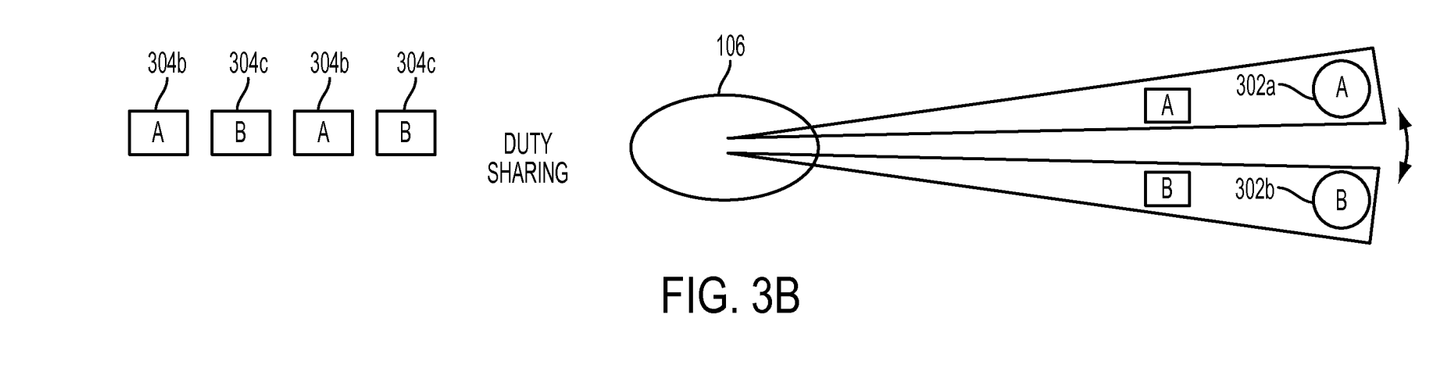
FIG. 3B illustrates a duty sharing mode.
Figure 3C:
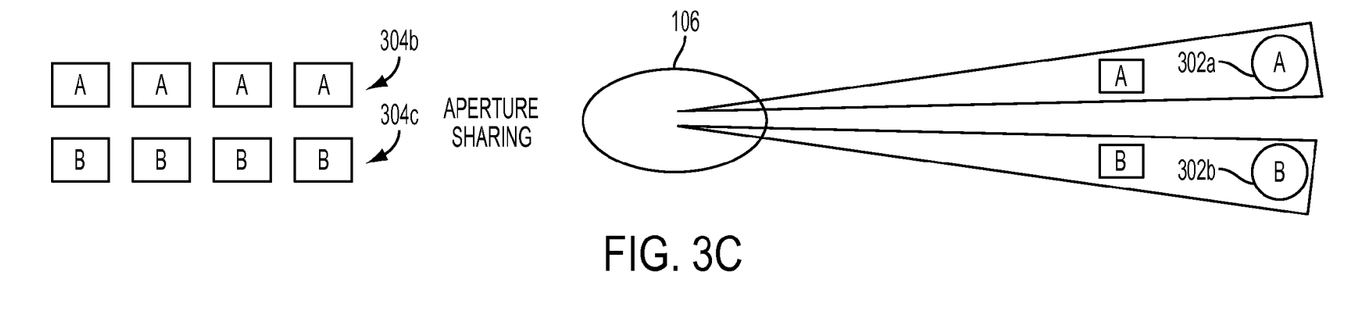
FIG. 3C illustrates an aperture sharing mode.
Figure 3D:
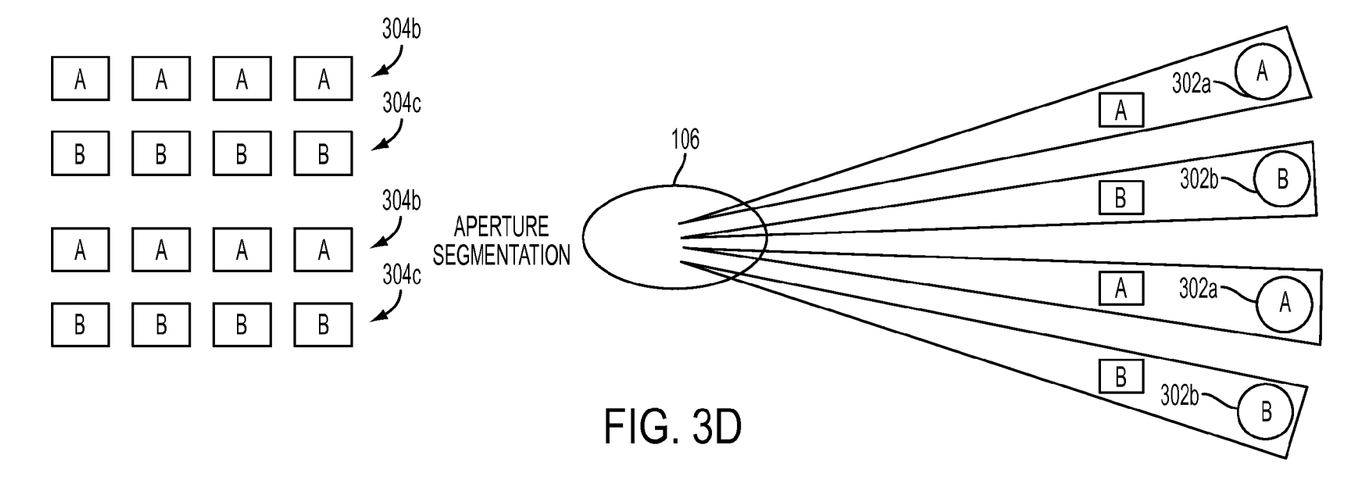
FIG. 3D illustrates an aperture segmentation mode.

FIGS. 3A-3D illustrate a block diagrams of example modes of operation for a system resource 106 that may be used to satisfy various jam assignments using a variety of techniques. The modes of operation may be used to allocate system resources to satisfy the desired assignments. In this regard, the system resource 106 includes a phased array emitter or transmitter that is operative to output electronic jamming signals that may be aimed at particular targets (e.g., target 302a and target 302b). FIG. 3A illustrates a technique sharing mode that allocates the system resource 106 to emit a particular signal 304a that is operative to jam both the target 302a and 302b. FIG. 3B illustrates a duty sharing mode that alternates between emitting the signals 304b and 304c. FIG. 3C illustrates an aperture sharing mode that emits the signals 304b and 304c substantially simultaneously. FIG. 3D illustrates an aperture segmentation mode that emits the signals 304b and 304c substantially simultaneously using a segmented aperture.

The allocation of the system resource 106 may be determined by a number of factors. For example, some targets may be jammed using a constant emission of a signal in a particular direction using a particular signal power. Other targets may be jammed using a cycled emission of a signal in a particular direction using a particular signal power. As shown above in FIGS. 3A-3D, the modes of operation of the system resource 106 may be chosen to most effectively allocate the system resource 106 to optimize the fulfillment of jam assignments (assignments). For a given system resource 106, the system resource 106 may have, for example, a maximum total power output, and maximum aperture sharing and segmentation parameters. Thus, the allocation of the system resource 106 may be determined partially by prioritizing assignments and allocating the system resource 106 based on the relative priority of each assignment, and the system resources needed to adequately accommodate each assignment.

In this regard, an assignment may include, for example, a set of tasks that may include signals that may be emitted to jam a target. Each task in the set of tasks may include different signal parameters such as, for example, duty factor, frequency, signal data, and signal power. Each signal parameter for a task may include a lowest satisfaction parameter. For example, for a constant signal aimed at a particular target, an ideal jamming signal may use at 100% duty factor with 80% of the total system resource power. However, the task may have a lowest satisfaction task parameter of 50% duty factor with 25% of the total system resource power.

For a particular mission, a jam assignment list is entered by a user. The jam assignment list includes a number of jam assignments, where each jam assignment includes associated tasks having satisfaction task parameters that define jam techniques. The methods and systems described below offer a method for logically optimizing the allocation of the system resources 106 to satisfy as many jam assignments on the jam assignment list using the available system resources 106. The system 100 may include a number of similar or dissimilar system resources 106 that may, for example, emit jam signals. Thus, the methods and systems described below provide for allocating tasks across a plurality of system resources 106.

Figure 4A:
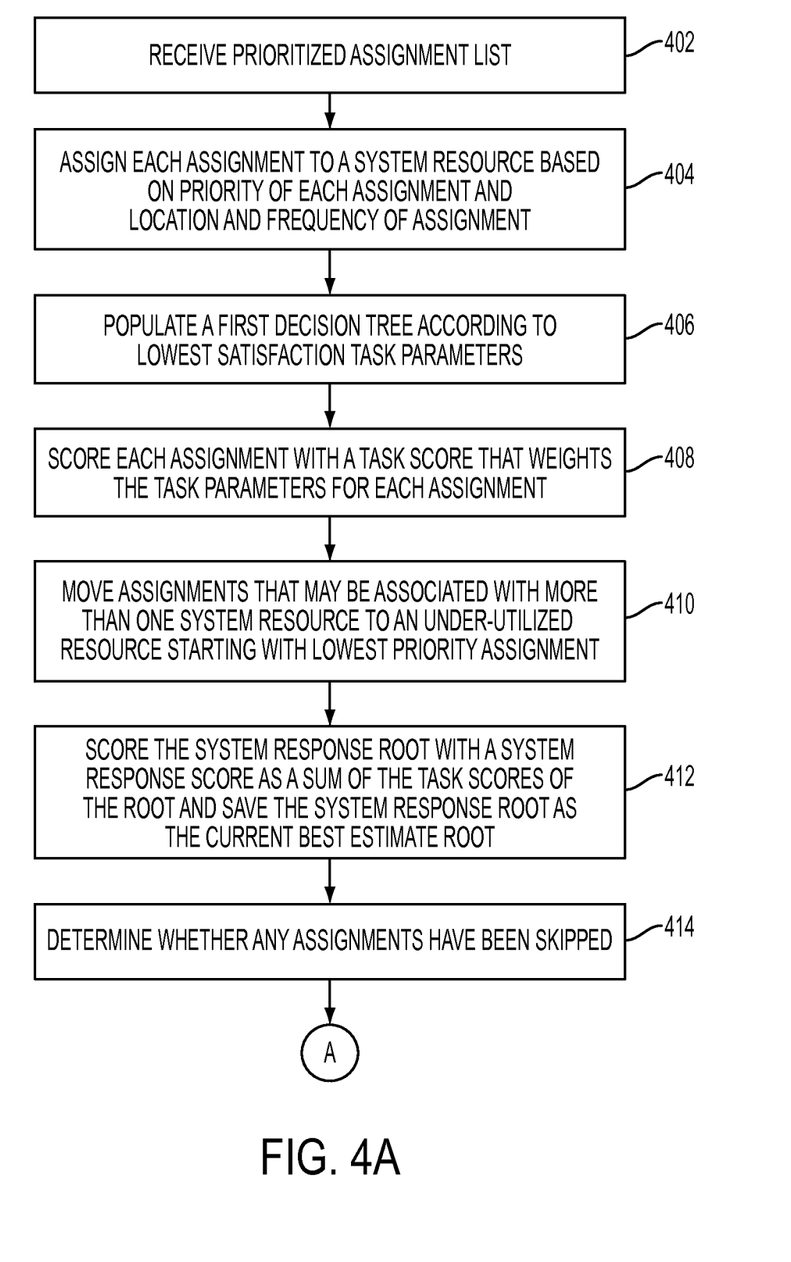
FIGS. 4A-4C illustrate a block diagram of an exemplary method for operating the system.

FIGS. 4A-4C illustrate a block diagram of an exemplary method 400 for operating the system 100 (of FIG. 1). The logic described in the method 400 may be performed by, for example, processing resources of the EA function manager 104. Referring to FIG. 4A, an assignment list is received in block 402 by the response selection portion 204 (of FIG. 2). In this regard, the assignment list may be generated by inputs by a user that include emitter and protected entity tracks and/or assignment cues. The emitter track includes the path or track that the jamming aircraft may follow on a particular mission, while the protected entity track may include the path or track that one or more other aircraft (protected entities) may follow on the mission. Assignment cues may include particular targets and data associated with the particular targets that may be jammed during the mission. The emitter and protected entity tracks and/or assignment cues are used to generate the assignment list, which includes a number of assignments. Each assignment on the assignment list is associated with a priority such that the assignments on the assignment list may be ordered according to their relative priorities. Each assignment includes a request to direct energy (signals) and techniques (e.g., signal parameters) at a certain location (azimuth/elevation) and frequency. An assignment may be a preemptive assignment that is planned during the mission planning phase, or an assignment may be reactive. A reactive assignment includes, for example, performing a task following the receipt of a stimulus during the mission (e.g., a fire control radar emits a fire control signal that is sensed by the system).

In block 404, each assignment is assigned to a system resource 106 based on the priority of each assignment beginning with the highest priority assignment on the assignment list and the highest task satisfaction score associated with the assignment. In block 406, a decision tree is populated for each system resource according to the lowest satisfaction task parameters associated with each assignment. Task parameters define techniques that may include, for example, effective isotropic radiated power (EIRP) and duty factor (time cycle) of the task.

Figure 5A:
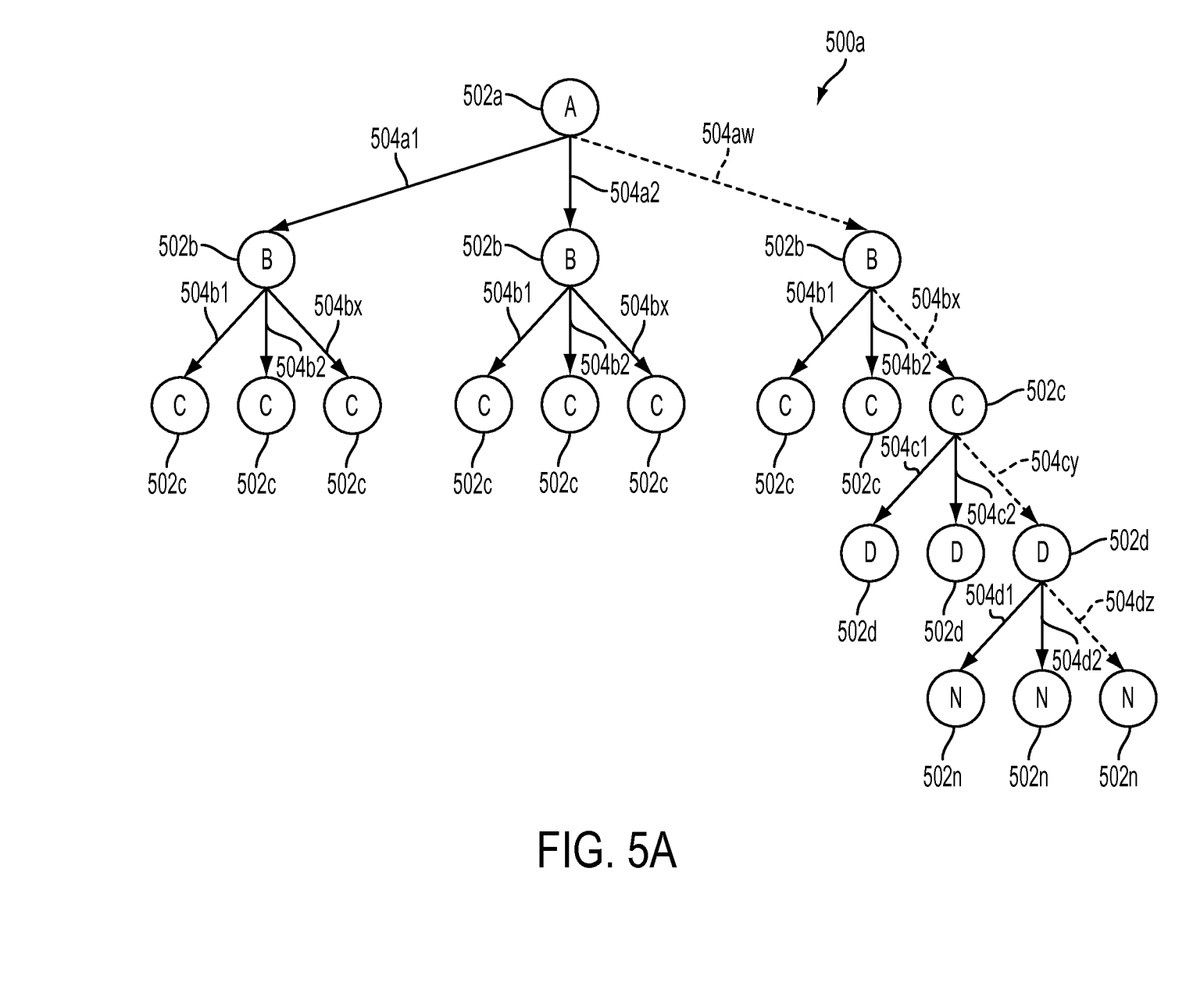
FIG. 5A illustrates an example of a decision tree.

In this regard, FIG. 5A illustrates an example of a decision tree 500a. The decision tree 500a includes assignments 502a-502n (for n number of assignments) that are ordered in the decision tree 500a according to the relative priorities of each assignment (e.g., assignment 502a has a higher priority than assignment 502b while assignment 502b has a higher priority than assignment 502c and so on.). The decision tree 500a is populated with task roots 504a1-504nn that each represents a technique or a set of task parameters having a different satisfaction level that may be used to fulfill an assignment 502. The task roots 504aw, 504bx, 504cy and 504dz that are indicated with dashed lines are the task parameters in the decision tree 500a that represent the system response root 1. The system response root 1 includes the lowest satisfaction task parameters (i.e., the roots having the lowest satisfaction task parameters).

Each of the task roots 504a1-504aw is associated with a particular technique having particular parameters (e.g., 100% duty cycle (504a1), 75% duty cycle (504a2), and 50% duty cycle (504aw), the lowest satisfaction task parameter) that may each satisfy the associated assignment 502b with a different satisfaction task parameter. The satisfaction task parameter score for each task may be assigned by a user when, for example, the assignment is associated with the tasks prior to generating the assignment list discussed above. Thus, a technique with a 100% duty cycle may be more effective, and a user may assign a high satisfaction parameter score to the task root associated with the technique with the 100% duty cycle, while the technique with the 50% duty cycle may be less effective, and a user may assign a lower satisfaction parameter score to the task root associated with the technique with the 50% duty cycle.

Referring to FIG. 4A, in block 408, the task roots are each associated with an assignment task score. For example, the solid lined task roots 504 are scored with a zero (0) score since the solid lined task roots 504 are not a part of the system response root 1, while the task roots 504*aw*, 504*bx*, 504*cy* and 504*dz* are scored with a "low" task score (e.g., 1). In block 410, any assignments that may be associated with one or more system resource is assigned to an under-utilized system resource starting by reassigning the lowest priority assignment.

In block 412, the system response root 1 is scored with a system response score that is defined by the sum of the task scores of the roots in the system response root 1. The system response root 1 and the associated system response score are saved as the current best estimate root. In block 414 the system determines whether any assignments have been skipped. If an assignment has been skipped, the system saves an indication associated with the system response root that indicates which assignment(s) have been skipped. The indication may be output to a user with the current best estimate root (described below).

Figure 4B:
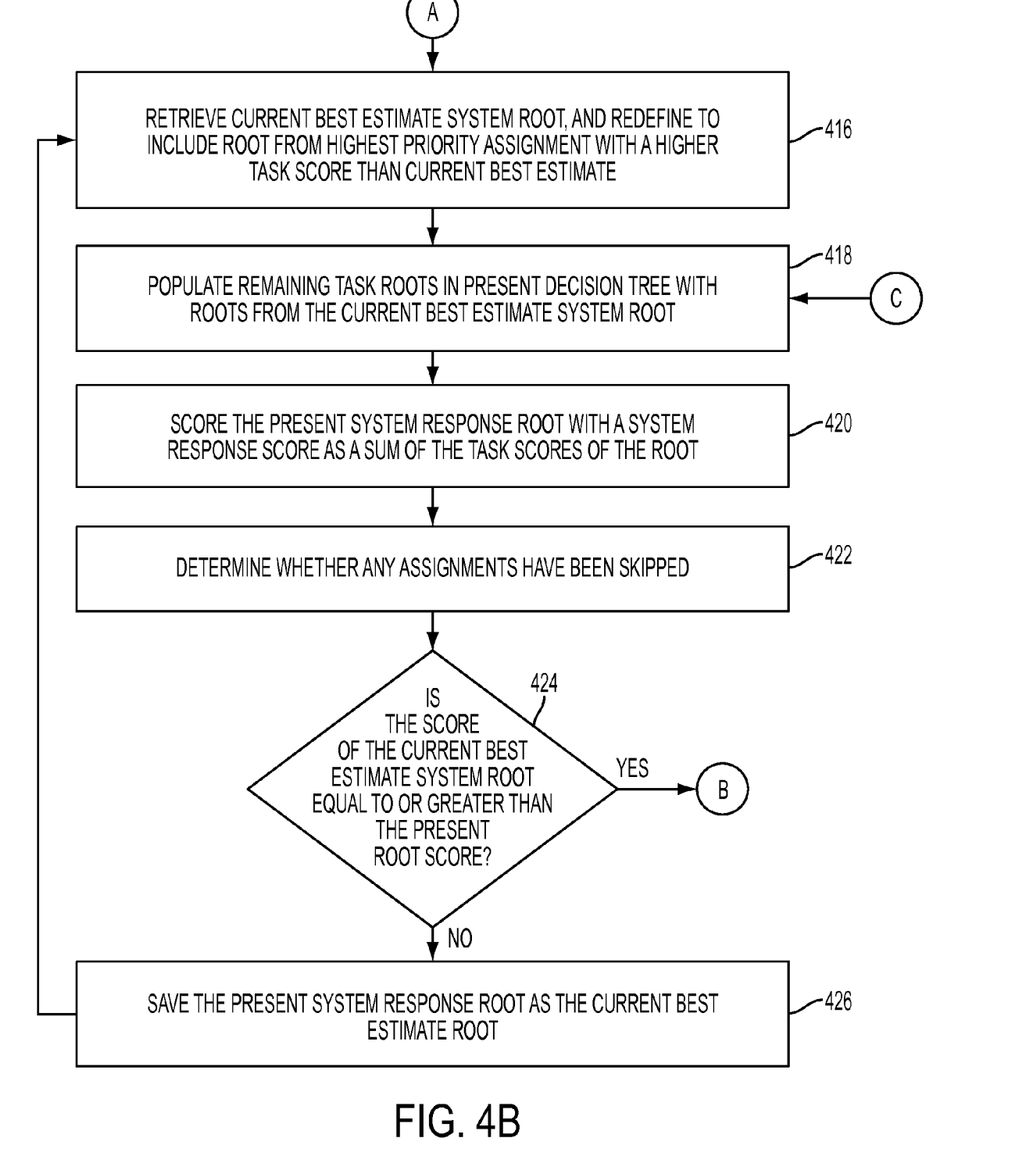
Figure 5B:
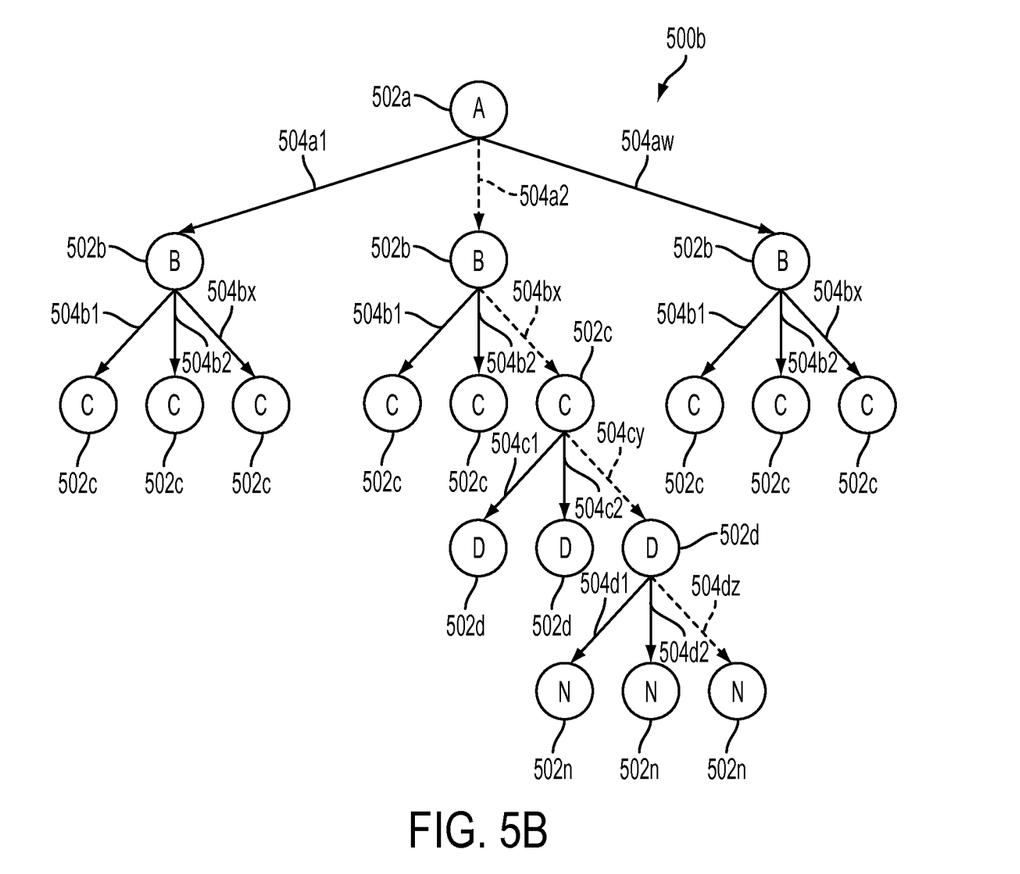
FIG. 5B illustrates another example of a decision tree.

Referring to FIG. 4B, in block 416, the current best estimate root is retrieved. The highest priority assignment (e.g., 502*a* of FIG. 5A) is selected and the system root is redefined to include a root from the highest priority assignment that has a higher task score than the associated root from the current best estimate. In block 418, the remaining task roots in the decision tree are populated using the previous root values from the current best estimate root. In this regard, FIG. 5B illustrates the resultant system response root 2 500*b*. The system response root 2 is indicated by the dashed lines and defined by the task roots 504*a*2, 504*bx*, 504*cy* and 504*dz*, where the task root 504*a*2 has a higher task score than the associated root (504*aw*) from the current best estimate. The present system response root is scored in block 420 to define a present system response root score. In block 422, the system determines whether any assignments have been skipped.

Figure 4C:
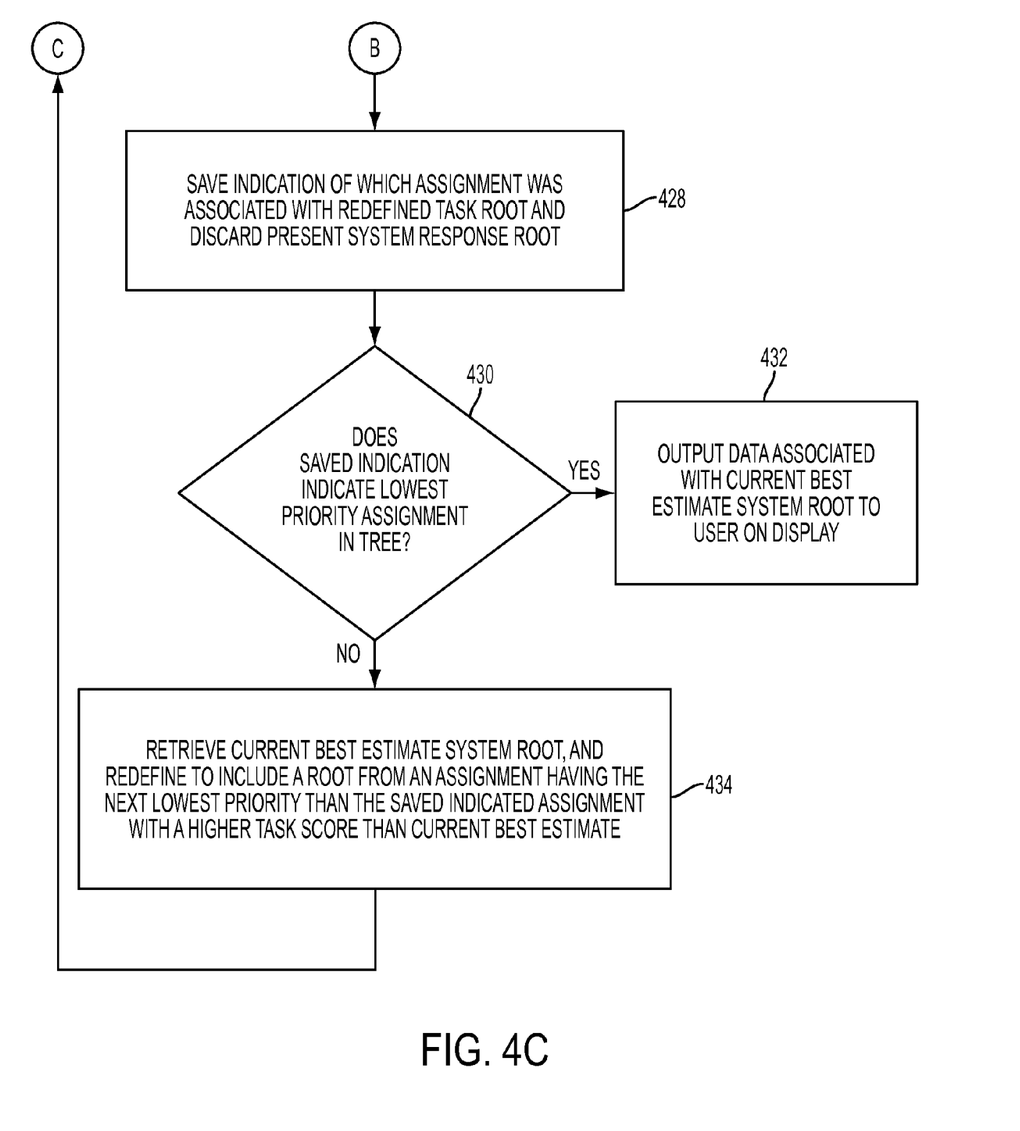
Figure 5C:
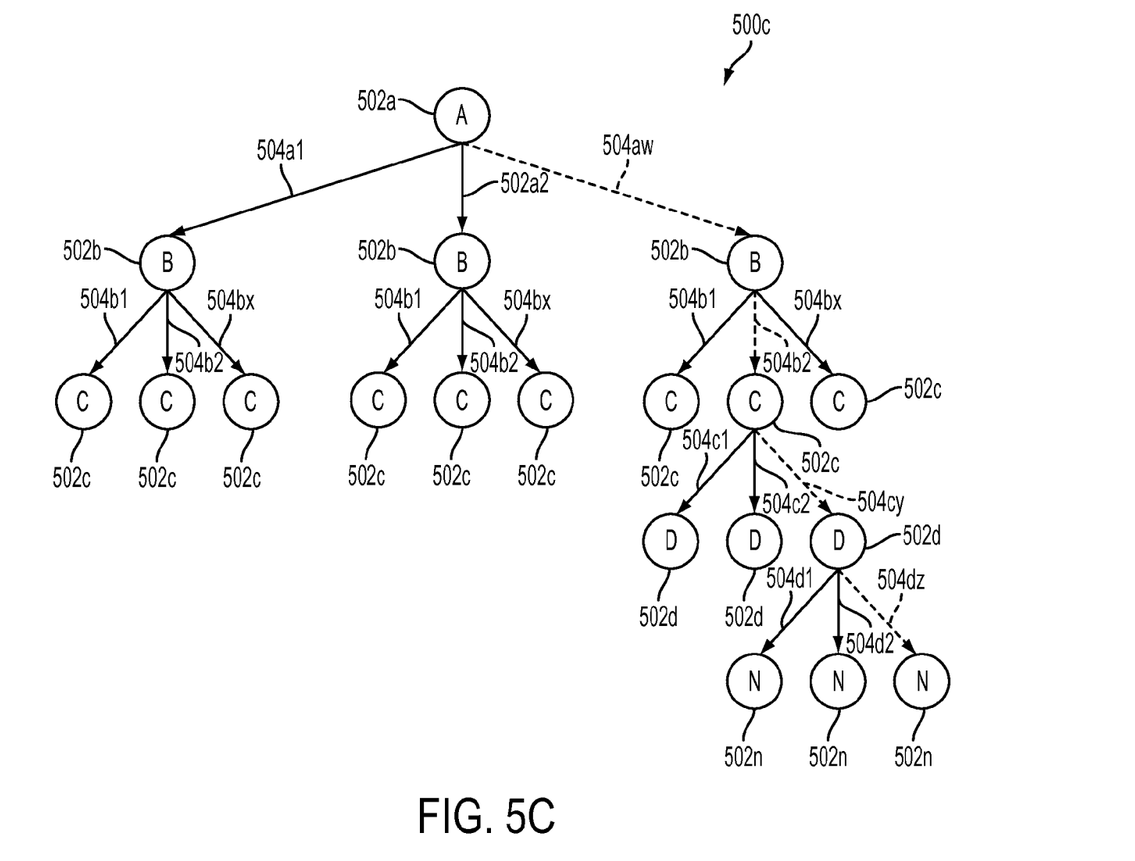
FIG. 5C illustrates yet another example of a decision tree.

In block 424, the present system response root score is compared with the system response root score of the current best estimate system root. If the current best estimate system root score is greater than or equal to the present system response root score, the present system response root is saved as the current best estimate root in block 462. Otherwise, in block 428 (of FIG. 4C), an indication of which assignment was associated with the redefined task root in the present system root is saved (e.g., assignment 502*a*), and the present system root is discarded. In block 430, the system determines whether the saved indication of which assignment was associated with the redefined task root in the present system root was the lowest priority assignment in the tree. If yes, in block 432, data associated with the current bets estimate system root is output to a user on a display. If no, in block 434, the current best estimate system root is retrieved, and is redefined as a present system root by selecting an assignment having the next lowest priority from the saved indicated assignment and redefining the root associated with the selected assignment as a root having a higher task score than the associated root in the current best estimate. In this regard, FIG. 5C illustrates an exemplary system root 500*c*. To arrive at the system root 500*c*, the system root 2 (of FIG. 5B) was discarded, and the saved indication indicated assignment 502*a*, thus, the next lowest priority assignment (502*b*) in the current best estimate (500*a*) is selected, and the system root is redefined to include the roots 504*aw*, 504*b*2, 504*cy*, and 504*dz*.

Once the data associated with the current best estimate system root is output to the user in block 432, the user may use the data to determine whether the allocation of the system resources provided by the system is acceptable to the user, and may input the allocation of system resources from the current best estimate into the system to configure the system 100 for the mission.

The technical effects and benefits of the embodiments described herein offer a method and system for managing and allocating system resources more effectively in an electronic warfare jamming system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for allocating system resources of an electronic warfare jamming system, the method comprising:

receiving, by a processor, an assignment list that includes a first assignment and a second assignment, where each assignment is assigned a priority and includes tasks associated with each assignment;

assigning each assignment to a system resource according to the assigned priority of each assignment;

populating a decision tree for the system resource, the decision tree including each assignment assigned to the system resource ordered by the relative priority of the assignments;

generating task roots associated with each task associated with each assignment in the decision tree;

associating each task root with a task score;

defining a first system resource root that includes the task roots having the lowest task scores;

calculating a first system resource root score as a function of the task scores of the first system resource root; and saving the first system resource root as the current best estimate system resource root.

2. The method of claim 1, wherein the method further comprises:

following the saving the first system resource root as the current best estimate system resource root, retrieving the current best estimate system resource root;

selecting the highest priority assignment;

selecting a task root associated with the selected assignment having a higher task score than the task root associated with the highest priority assignment in the current best estimate system resource;

defining a second system resource root that includes the selected task root and roots associated with unselected assignments of the current best estimate system resource root;

calculating a second system resource root score as a function of the task scores of the second system resource root;

determining whether the first system resource root score is greater than the second system resource root score; and outputting data associated with the current best estimate system resource root to a user on a display responsive to determining that the first system resource root score is greater than the second system resource root score.

3. The method of claim 2, further comprising:

responsive to determining that the first system resource root score is not greater than the second system resource root score, discarding the current best estimate system resource root; and saving the second system resource root as the current best estimate system resource root.

4. The method of claim 2, further comprising responsive to determining that the first system resource root score is greater than the second system resource root score, saving an indication of which assignment was the selected assignment.

5. The method of claim 4, further comprising:

determining whether the saved indication indicates a lowest priority assignment in the decision tree; and outputting the data associated with the current best estimate system resource root to a user on a display responsive to determining that the first system resource root score is greater than the second system resource root score responsive to determining that the saved indication indicates the lowest priority assignment in the decision tree.

6. The method of claim 5, further comprising:

retrieving the current best estimate system resource root;

selecting the assignment having a next lowest priority than the indicated assignment;

select a task root associated with the selected assignment having a higher task score than the task root associated with the highest priority assignment in the current best estimate system resource;

defining a third system resource root that includes the selected task root and roots associated with unselected assignments of the current best estimate system resource root;

calculating a third system resource root score as a function of the task scores of the second system resource root;

determining whether a system resource root score associated with the current best estimate system root is greater than the third system resource root score; and outputting data associated with the current best estimate system resource root to a user on a display responsive to determining that the system resource root score associated with the current best estimate system root is greater than the third system resource root score.

7. The method of claim 1, wherein the first system resource includes a transmitter.

8. The method of claim 1, wherein each task is associated with a task parameter.

9. The method of claim 8, wherein the task parameter includes an effective isotropic radiated power parameter.

10. The method of claim 8, wherein the task parameter includes a duty cycle parameter.

11. The method of claim 1, wherein each assignment includes an electronic warfare jamming assignment.

12. An electronic warfare jamming system comprising:

a first system resource; and a processing system operative to:

receive, by a processor, an assignment list that includes a first assignment and a second assignment, where each assignment is assigned a priority and includes tasks associated with each assignment;

assign each assignment to a system resource according to the assigned priority of each assignment;

populate a decision tree for the system resource, the decision tree including each assignment assigned to the system resource ordered by the relative priority of the assignments;

generate task roots associated with each task associated with each assignment in the decision tree;

associate each task root with a task score;

define a first system resource root that includes the task roots having the lowest task scores;

calculate a first system resource root score as a function of the task scores of the first system resource root; and save the first system resource root as the current best estimate system resource root.

13. The system of claim 12, wherein the system is further operative to:

following saving the first system resource root as the current best estimate system resource root, retrieve the current best estimate system resource root;

select the highest priority assignment;

select a task root associated with the selected assignment having a higher task score than the task root associated with the highest priority assignment in the current best estimate system resource;

define a second system resource root that includes the selected task root and roots associated with unselected assignments of the current best estimate system resource root;

calculate a second system resource root score as a function of the task scores of the second system resource root;

determine whether the first system resource root score is greater than the second system resource root score; and output data associated with the current best estimate system resource root to a user on a display responsive to determining that the first system resource root score is greater than the second system resource root score.

14. The system of claim 13, wherein the processing system is further operative to:

responsive to determining that the first system resource root score is not greater than the second system resource root score, discarding the current best estimate system resource root; and save the second system resource root as the current best estimate system resource root.

15. The system of claim 13, wherein the processing system is further operative to responsive to determining that the first system resource root score is greater than the second system resource root score, save an indication of which assignment was the selected assignment.

16. The system of claim 15, wherein the processing system is further operative to:
   determine whether the saved indication indicates a lowest priority assignment in the decision tree; and
   output the data associated with the current best estimate system resource root to a user on a display responsive to determining that the first system resource root score is greater than the second system resource root score responsive to determining that the saved indication indicates the lowest priority assignment in the decision tree.

17. The system of claim 16, wherein the processing system is further operative to:
   retrieve the current best estimate system resource root;
   select the assignment having a next lowest priority than the indicated assignment;
   select a task root associated with the selected assignment having a higher task score than the task root associated with the highest priority assignment in the current best estimate system resource;
   define a third system resource root that includes the selected task root and roots associated with unselected assignments of the current best estimate system resource root;
   calculate a third system resource root score as a function of the task scores of the second system resource root;
   determine whether a system resource root score associated with the current best estimate system root is greater than the third system resource root score; and
   output data associated with the current best estimate system resource root to a user on a display responsive to determining that the system resource root score associated with the current best estimate system root is greater than the third system resource root score.

18. The system of claim 13, wherein the first system resource includes a transmitter.

19. The system of claim 13, wherein each task is associated with a task parameter.

20. The system of claim 19, wherein the task parameter includes an effective isotropic radiated power parameter.

* * * * *